(12) United States Patent
Yoshikawa et al.

(10) Patent No.: US 7,250,215 B2
(45) Date of Patent: Jul. 31, 2007

(54) ALUMINUM NITRIDE SINTERED BODY CONTAINING CARBON FIBERS AND METHOD OF MANUFACTURING THE SAME

(75) Inventors: Jun Yoshikawa, Nagoya (JP); Naohito Yamada, Nagoya (JP); Hiroya Sugimoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 186 days.

(21) Appl. No.: 10/876,260

(22) Filed: Jun. 24, 2004

(65) Prior Publication Data

US 2005/0014628 A1   Jan. 20, 2005

(30) Foreign Application Priority Data

Jul. 7, 2003   (JP) ............................ P2003-193006
Jan. 8, 2004   (JP) ............................ P2004-003007

(51) Int. Cl.
   *B32B 9/00*   (2006.01)
(52) U.S. Cl. ..................................................... 428/408
(58) Field of Classification Search ............. 428/293.4, 428/408, 209, 698; 501/98; 118/723 R
   See application file for complete search history.

(56) References Cited

U.S. PATENT DOCUMENTS 5,258,224 A * 11/1993 Langlois, Jr. et al. ........ 428/325
5,516,734 A * 5/1996 Kuszyk et al. ............. 501/95.3
6,310,755 B1 * 10/2001 Kholodenko et al. ........ 361/234
6,495,258 B1 * 12/2002 Chen et al. .................. 428/408
6,838,162 B1 * 1/2005 Gruber et al. ............ 428/293.4

FOREIGN PATENT DOCUMENTS

| EP | 1 254 874 A1 | 11/2002 |
| JP | 09-315867 A1 | 12/1997 |
| JP | 2001-163672 A1 | 6/2001 |
| JP | 2003-055052 A1 | 2/2003 |
| KR | 2002-0092929 | 12/2002 |
| WO | 01/47831 A1 | 7/2001 |

* cited by examiner

*Primary Examiner*—Jennifer McNeil
*Assistant Examiner*—Daniel Miller
(74) *Attorney, Agent, or Firm*—Burr & Brown

(57) ABSTRACT

An aluminum nitride sintered body containing carbon fibers is provided. This aluminum nitride sintered body is obtained by mixing carbon fibers and aluminum nitride together to form mixed powder, molding the mixed powder to form a compact, and heating and sintering the compact in any of a vacuum atmosphere, an inert atmosphere and a reductive atmosphere. By using electric conductivity and shapes with high aspect ratios of the carbon fibers, continuous electrically conductive paths are formed with a small content of the carbon fibers. In this way, a value of resistance of the aluminum nitride sintered body is reduced.

22 Claims, 3 Drawing Sheets

ALUMINUM NITRIDE SINTERED BODY CONTAINING CARBON FIBERS AND METHOD OF MANUFACTURING THE SAME

CROSS REFERENCE TO RELATED APPLICATION

This application is based upon and claims the benefit of priority from prior Japanese Patent Applications No. 2003-193006 filed on Jul. 7, 2003 and No. 2004-003007 filed on Jan. 8, 2004; the entire contents of which are incorporated herein by reference.

BACKGROUND OF THE INVENTION

1. Field of the Invention

The present invention relates to a ceramic sintered body, more specifically to an aluminum nitride sintered body, various members using this sintered body, and a method of manufacturing the aluminum nitride sintered body.

2. Description of the Related Art

Aluminum nitride sintered bodies have favorable heat resistance and corrosion resistance as well as high thermal conductivity, and have been heretofore used widely as a base substance material for an electrostatic chuck for fixing a wafer, a ceramic heater for heating the wafer, and the like in semiconductor-manufacturing apparatuses such as a plasma etching apparatus or a plasma chemical vapor deposition (CVD) apparatus.

In terms of an application as the electrostatic chuck, Johnsen-Rahbek force is mainly used as chucking force at the moment. To obtain favorable chucking force, this electrostatic chuck requires a base substance material having relatively low volume resistivity in a range from $10^8$ to $10^{12}$ Ωcm. However, aluminum nitride per se is a high-resistance material having volume resistivity at room temperature equal to or above $10^{14}$ Ωcm, and is therefore subject to reduction in a value of resistance.

The applicant has heretofore developed an aluminum nitride sintered body having reduced resistance in a range from about $10^8$ to $10^{12}$ Ωcm by means of adding a rare-earth oxide such as yttrium oxide, cerium oxide or samarium oxide to an aluminum nitride sintered body.

As described above, in the base substance material used for the electrostatic chuck, it is necessary to obtain the volume resistivity in a range from about $10^8$ to $10^{12}$ Ωcm to obtain the chucking force based on Johnsen-Rahbek's principle. However, among ceramic members used in semiconductor-manufacturing apparatuses, there is a case where a lower value of resistance is required depending on an application.

For example, in a plasma etching apparatus or the like, a ring-shaped ceramic member is placed around the electrostatic chuck to prevent the base substance of the electrostatic chuck from corrosion by halide gas. An insulative ceramic has been conventionally used for this ring-shaped member. However, to generate uniform and stable plasma on a wafer to be placed on the electrostatic chuck, it is desired to use a material having the volume resistivity equivalent to that of the wafer as the ring-shaped member which is exposed around the wafer. Accordingly, it is necessary to provide the base substance material for the ring-shaped member with electric conductivity equal to or below $10^4$ Ωcm, which represents a semiconductor region equivalent to a silicon wafer, for example. Moreover, a ceramic member having higher electric conductivity can diversify usability not only for semiconductors but also for various applications as an electrically conductive member provided with corrosion resistance, heat resistance and strength.

For example, a method of adding an electrically conductive material such as titanium nitride (TiN) with an insulative ceramic material is known as a method of reducing a value of resistance of a ceramic. However, to obtain the volume resistivity equal to or below $10^4$ Ωcm by this method, a large amount of the electrically conductive material equal to or above 20% must be added because it is necessary to form electrically conductive paths inside the ceramic material by use of the electrically conductive material.

However, when such a large amount of the electrically conductive material is added, it is difficult to maintain properties of the ceramic material being a mother material. For example, when aluminum nitride is used as the mother material, there is a risk of damaging the high thermal conductivity, the heat resistance, and halogen resistance of aluminum nitride. Therefore, to maintain the properties of the mother material, it is desired to use an additive material which can reduce the value of volume resistivity by adding the material as little as possible.

In addition, use of a material having even lower resistance equal to or below 10 Ωcm is expected depending on certain use conditions. In this case as well, the material is expected to maintain the corrosion resistance, the heat resistance and the strength required for an application. Accordingly, it is preferable that an amount of the additive material remains within a range which can maintain these properties.

SUMMARY OF THE INVENTION

An object of the present invention is to provide an aluminum nitride sintered body having low volume resistivity, various members using this sintered body, and a method of manufacturing an aluminum nitride sintered body.

An aluminum nitride sintered body according to a first aspect of the present invention includes carbon fibers, and volume resistivity thereof is controlled by a condition of the contained carbon fibers.

A method of manufacturing an aluminum nitride sintered body according to a second aspect of the present invention includes mixing aluminum nitride raw material powder and carbon fibers and thereby producing mixed raw material powder, molding the mixed raw material powder and forming a compact, and heating and sintering the compact in any of a vacuum atmosphere, an inert atmosphere and a reductive atmosphere and thereby forming a sintered body.

An electrostatic chuck according to a third aspect of the present invention includes a dielectric layer made of the aluminum nitride sintered body of the first aspect, and an electrode embedded in the aluminum nitride sintered body.

An aluminum nitride sintered body according to a fourth aspect of the present invention is used as any of a component for a semiconductor-manufacturing apparatus, an antistatic component, an electric-field control component and a resistive heating element.

DETAILED DESCRIPTION OF THE EMBODIMENTS

Figure 1:
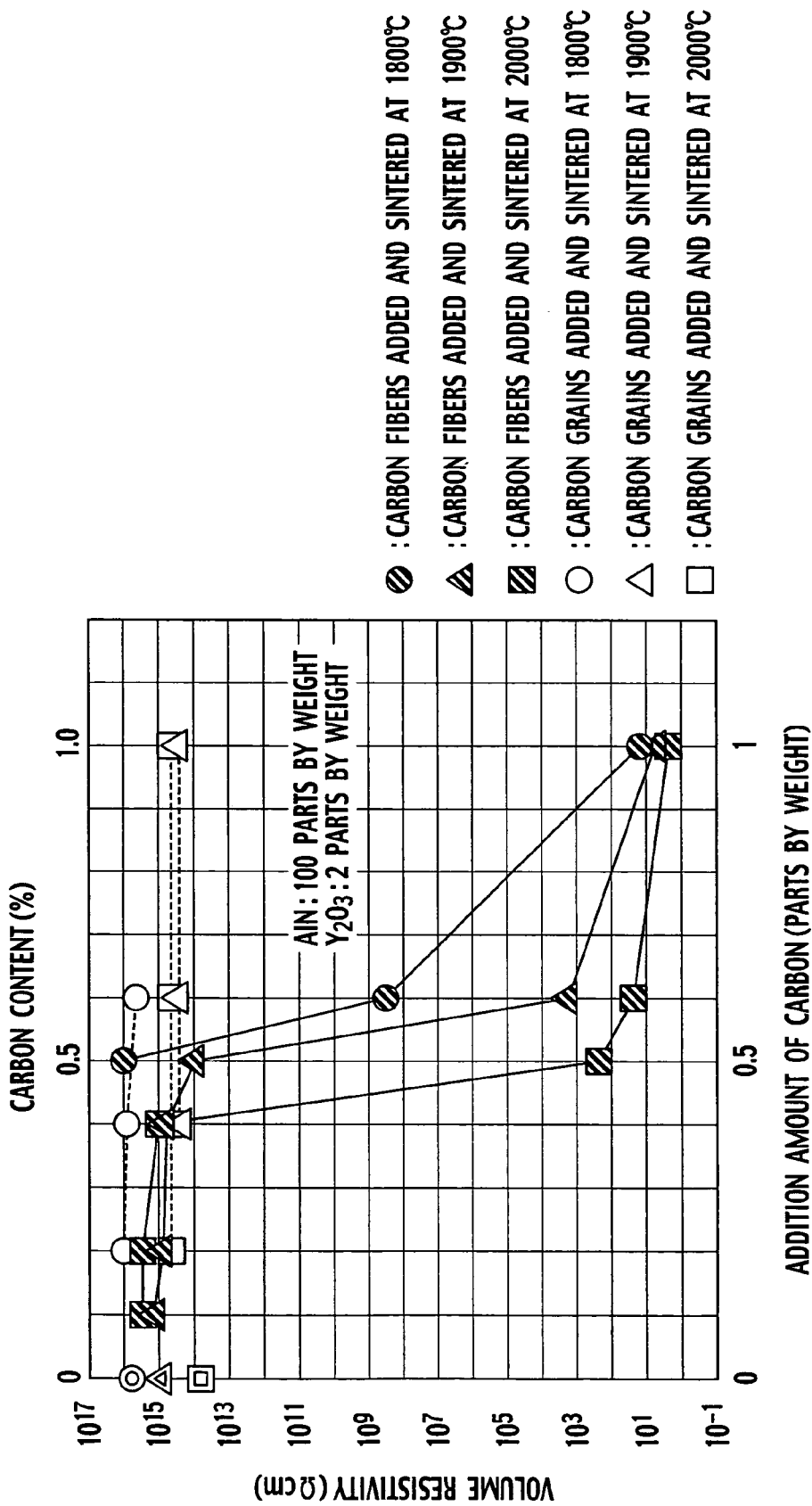
FIG. 1 is a graph showing relations between addition amounts of carbon and volume resistivity values of aluminum nitride sintered bodies according to examples and comparative examples of the present invention.

An aluminum nitride sintered body according to an embodiment of the present invention is characterized in that carbon fibers are added to the aluminum nitride sintered body so as to control electric properties thereof, or more particularly volume resistivity thereof. The aluminum nitride sintered body according to this embodiment preferably has either volume resistivity at room temperature which is equal to or below $10^{12}$ Ωcm, or electric conductivity equal to or below $10^4$ Ωcm.

In the present invention, the "aluminum nitride sintered body" means a sintered body containing aluminum nitride (AlN) as a major component. Therefore, other components may be also contained as an additive material or as impurities.

Here, the carbon fiber is a carbon material having a fibrous shape, and the fibrous shape includes various shapes such as a shaft shape, a whisker shape or a tubular shape.

The carbon fiber generally has electric conductivity and a high aspect ratio (fiber length/fiber diameter). Accordingly, when the carbon fibers are added to an aluminum nitride sintered body, the carbon fibers contained therein easily contact one another as compared to a case of adding grain-shaped electrically conductive material of the same weight. Therefore, by a small addition amount, it is possible. to form continuous electrically conductive paths made of the carbon fibers inside the aluminum nitride sintered body. Accordingly, it is possible to reduce the volume resistivity of the aluminum nitride sintered body while maintaining original favorable properties such as high thermal conductivity, heat resistance and corrosion resistance.

Meanwhile, in a conventional method of reducing a value of resistance of the aluminum nitride sintered body by adding a rare-earth oxide, the volume resistivity shows a high dependency on a temperature. Accordingly, the volume resistivity tends to be considerably reduced when raising the temperature. However, it is possible to suppress the temperature dependency by forming the electrically conductive paths with the carbon fibers having the electrically conductive property as in the case of the aluminum nitride sintered body according to this embodiment.

Indices for the addition amount of the carbon fibers are determined as various conditions depending on the type of the carbon fibers to be added and on the level of the volume resistivity of the aluminum nitride sintered body to be ultimately obtained. Here, when attempting to reduce the resistance of the aluminum nitride sintered body to equal to or below $10^{12}$ Ωcm while substantially maintaining the properties of the aluminum nitride as the mother material, the content of the carbon fibers is set to equal to or below 5%, preferably equal to or below 1%, or more preferably either in a range from 0.4% to 5% or in a range from 0.6% to 1%. Note that the "percent" means the "percent by mass" in this specification.

When the content of the carbon fibers is in a range from 0.4% to 0.6%, the volume resistivity of the aluminum nitride sintered body is drastically reduced and it is possible to obtain the volume resistivity equal to or below $10_{12}$ Ωcm. Meanwhile, when the content of the carbon fibers exceeds 5%, it is difficult to maintain the properties of aluminum nitride being the mother material, in particular, the thermal conductivity, the heat resistance and corrosion resistance. On the contrary, it is possible to maintain the properties of aluminum nitride being the mother material favorably when the content of the carbon fibers is equal to or below 1%. For example, in light of the thermal conductivity, it is possible to maintain a high value equal to or above 100 W/mK, or more preferably equal to or above 130 W/mK. It is also possible to maintain approximately the same level of the properties in light of the heat resistance and the corrosion resistance to halogen gas and the like. Moreover, in light of mechanical strength, it is also possible to maintain a value equal to or above 300 MPa. Here, in terms of the mechanical strength, addition of the carbon fibers rather increases the strength. Meanwhile, the microstructure of the aluminum nitride sintered body is not substantially changed by containing the carbon fibers, and open porosity can be suppressed to equal to or below 0.1% as well.

Moreover, when attempting to obtain the electric conductivity equal to or below. $10^4$ Ωcm which is equivalent to a semiconductor or conductor level, the content of the carbon fibers is set to equal to or below 20%, preferably in a range equal to or below 10%, or more preferably either in a range from 0.4% to 20% or in a range from 1% to 10%. Although it is possible to obtain the electric conductivity equal to or below $10^4$ Ωcm when the content of the carbon fiber is equal to or above 0.4%, the electric conductivity equal to or below $10^4$ Ωcm can be surely obtained when the content is equal to or above 1%. Here, it is possible to obtain the electric conductivity equal to or below 10 Ωcm when the content is set to equal to or above 2%, and to obtain the electric conductivity equal to or below $10^{-1}$ Ωcm when the content is set to equal to or above 5%. On the contrary, when the content of the carbon fibers exceeds 20%, the effect of reduction of the volume resistivity almost disappears and the property of the aluminum nitride, in particular, the thermal conductivity is considerably deteriorated. Meanwhile, when the content is equal to or below 10%, it is possible to maintain the favorable thermal conductivity, heat resistance and corrosion resistance.

When the content of the carbon fibers is set to equal to or below 20%, or more preferably equal to or below 10%, it is possible to produce a sintered body under manufacturing conditions which are similar to those used for a sintered body not containing the carbon fibers. In other words, it is possible to maintain a favorable sintering property of the aluminum nitride sintered body.

Although there are many kinds of carbon fibers with various sizes and structures, it-is preferable to use one having a small diameter and a high aspect ratio when possible. A small diameter and a high aspect ratio of carbon fibers make it easy to have the carbon fibers contact each other and to form the electrically conductive paths. As a result, it is possible to reduce the value of resistance efficiently by a less addition amount.

Moreover, it is preferable that an average fiber length of the carbon fibers is longer than an average grain size of the aluminum nitride. When the average fiber length of the carbon fibers is smaller than the grain size of the aluminum nitride, the carbon fiber tends to be buried completely in each aluminum nitride grain. As a result, it is less likely that the carbon fiber contacts other carbon fibers outside the aluminum nitride grain. Accordingly, the carbon fiber which is completely buried may not contribute to formation of the continuous electrically conductive paths in the entire sintered body. Therefore, to reduce the volume resistivity of the aluminum nitride sintered body efficiently, it is preferable that the fiber length of the carbon fiber is longer than the average grain size of the aluminum nitride so that a part of the carbon fiber protrudes out of the aluminum nitride grain even when the carbon fiber is taken into the aluminum nitride grain.

It is preferable that an average aspect ratio (fiber length/fiber diameter) of the carbon fibers is equal to or above 5, or more preferably equal to or above 10. When the carbon fibers have the aspect ratios equal to or above 5 or equal to or above 10, the contained carbon fibers can easily contact one another and the electrically conductive paths can be easily formed by a small content thereof. It is preferable that an average fiber diameter of the carbon fibers is equal to or below 1 μ. When the carbon fibers have such small diameters, it is possible to impart the electric conductivity efficiently with a less addition amount.

Simultaneously with reducing the value of resistance of the aluminum nitride sintered body efficiently by adding the small amount of the carbon fibers, it is preferable to increase dispersion of the carbon fibers in the aluminum nitride sintered body in order to increase the strength as well. Specifically, it is preferable to disperse the carbon fibers inside the aluminum nitride grains as well as at grain boundaries. This improves the strength of the entire sintered body by increasing the strength inside the aluminum nitride grains as well as the strength at the grain boundaries. For example, when the average fiber diameter of the carbon fibers is set to equal to or below 1/5 of the average grain size of the aluminum nitride, or more preferably in a range from 5 nm to 200 nm, the carbon fibers are reasonably taken into the aluminum nitride grains because the diameters of the carbon fibers are sufficiently small as compared to the grain sizes of the aluminum nitride. As mentioned above, favorable dispersion of the carbon fibers makes it possible to improve the strength of the aluminum nitride sintered body.

It is also possible to use carbon nanotubes as the carbon fibers. The carbon nanotube has a diameter ranging from about several nanometers to several tens of nanometers and a length reaching several micrometers, which represent an extremely high aspect ratio. Accordingly, it is possible to form the electrically conductive paths for obtaining desired volume resistivity with a small addition amount.

Either single-wall carbon nanotubes or multiwall carbon nanotubes can be used herein. In addition, a manufacturing method thereof is not particularly limited. Accordingly, it is possible to use carbon nanotubes which are manufactured by various methods including the arc discharge method, the laser abrasion method, the plasma synthesis method, the hydrocarbon catalytic decomposition method, and the like.

The carbon nanotubes range from those having electrically conductive properties to those having semiconductive properties depending on geometric structures in terms of chirality, diameter, length, and the like. Accordingly, it is possible to select the type of the carbon nanotubes for use based on the electric conductivity level of the aluminum nitride sintered body to be finally obtained. Moreover, it is possible to use a mixture of different types of carbon nanotubes.

It is also possible to adjust the volume resistivity by using one containing a large amount of carbon nanotubes having semiconductive properties in the case of production of the aluminum nitride sintered body having the relatively high volume resistivity, or by mainly using electrically conductive carbon nanotubes when intended to form the aluminum nitride sintered body having the volume resistivity equivalent to that of a semiconductor wafer or to impart even lower electric conductivity thereto.

Here, it is possible to allow the aluminum nitride sintered body in this embodiment to contain a rare-earth element in a range from 0.2% to 10% when calculated as an oxide. Since the rare-earth oxide functions as a sintering agent, it is possible to lower a sintering temperature. Addition of the rare-earth oxide also brings an effect to increase the thermal conductivity. To further promote sintering, it is preferable to set the content of the rare-earth element to equal to or above 0.2% when calculated as an oxide, and is more preferable to set the content to equal to or above 0.5%. Meanwhile, from the viewpoint of maintaining the properties of the aluminum nitride sintered body, it is preferable to set the content of the rare-earth element to equal to or below 8% when calculated as an oxide.

Here, as the rare-earth element, it is possible to use at least one element selected from the group consisting of samarium, scandium, yttrium, lanthanum, cerium, praseodymium, neodymium, promethium, europium, gadolinium, terbium, dysprosium, holmium, erbium, thulium, ytterbium, and lutetium. Among these elements, it is preferable to use at least one element selected from the group consisting of yttrium, lanthanum, cerium, neodymium, samarium, gadolinium, dysprosium, erbium, and ytterbium.

The electric conductivity of the aluminum nitride sintered body can be adjusted mainly by dimensions (the shape of the fiber, the fiber diameter, the fiber length, and the aspect ratio) of the carbon fibers and the amount of the carbon fibers. However, the type of the carbon fibers to be added is not limited to one type and it is also possible to use a combination of carbon fibers of different dimensions.

Next, a method of manufacturing an aluminum nitride sintered body according to the embodiment of the present invention will be described.

Firstly, aluminum nitride raw material powder, carbon fibers, and preferably a rare-earth oxide such as yttrium oxide are mixed in a predetermined proportion, and a solvent such as isopropyl alcohol is added thereto. The mixture is mixed together by use of a mixer-crusher such as a pot mill, a trommel or an attrition mill. The mixing process may be performed either by a wet type or by a dry type. When applying the wet type, the mixture is dried after mixing by a spray dry method or the like to obtain raw material mixed powder. Moreover, it is preferable to sift the dry powder after executing vacuum drying so as to adjust grain sizes thereof.

Here, it is possible to add a binder component such as polyvinyl alcohol to the raw material mixed powder. In this case, it is necessary to pay attention to prevent the carbon fibers from oxidation and disappearance by use of a method of performing a debinding process in an inert atmosphere such as nitrogen, for example.

A method of manufacturing the aluminum nitride raw material powder is not particularly limited, and it is possible to use the reduction nitriding method, the gas-phase synthesis method, the direct nitriding method, and the like. As described above, the carbon fibers with the aspect ratio equal to or above 5, or more preferably the carbon fibers with the aspect ratio equal to or above 10 are used herein. It is also possible to use carbon nanotubes as the carbon fibers.

The addition amount of the carbon fibers is determined in conformity to electric and physical properties which are required for an application of the sintered body to be ultimately obtained. For example, when attempting to obtain the volume resistivity equal to or below $10^{12}$ Ωcm while maintaining the physical properties equivalent to the aluminum nitride mother material, the addition amount of the carbon fibers is preferably set to equal to or below 5 parts by weight relative to 100 parts by weight of the aluminum nitride raw material powder, or more preferably equal to or below 1 part by weight. Meanwhile, when attempting to obtain the volume resistivity equal to or below $10^4$ Ωcm while maintaining favorable strength, heat resistance and corrosion resistance, the addition amount of the carbon fibers is preferably set to equal to or below 20 parts by weight relative to 100 parts by weight of the aluminum nitride raw material powder, or more preferably equal to or below 10 parts by weight.

Meanwhile, when adding the rare-earth oxide, such a proportion is preferably set in a range from 0.2 part by weight to 20 parts by weight inclusive, or more preferably to equal to or below 10 parts by weight. Here, as an yttrium oxide source, it is also possible to apply precursors for forming oxides by heating, such as nitrate, sulfate, oxalate, chloride or alkoxide.

Thereafter, the raw material mixed powder thus obtained is subjected to pressure forming by use of a mold press, thereby obtaining a compact of a desired shape such as a disk.

Moreover, the obtained compact is heated and sintered by use of the hot press method, the pressureless sintering method or the like, and the sintered body is produced. At this time, the atmosphere during heating and sintering the compact is selected from a vacuum atmosphere, an inert atmosphere or a reducing atmosphere so as to prevent the contained carbon fibers from oxidation and destruction by sintering. Although the sintering temperature varies depending on an addition amount of sintering aids, it is preferable to set the temperature in a range from 1650° C. to 2200° C.

In the aluminum nitride sintered body obtained after sintering, the carbon fibers remain on the grain boundaries and inside the grains in a dispersed state while substantially maintaining the fibrous structures at the raw material stage. The carbon fibers contact adjacent carbon fibers inside the aluminum nitride sintered body and thereby form continuous and three-dimensional electrically conductive paths.

When producing an electrostatic chuck or a heater, a given electrode is buried in the forming process. For example, in the case of the electrostatic chuck, a planar electrode made of a metallic bulk material and provided with a perforated pattern, or more preferably, a mesh electrode may be buried into the raw material powder. When producing the heater, a resistive heating element electrode made of a metallic bulk material and formed into a coil shape, a spiral shape or the like is buried as similar to the electrostatic chuck. In any of these cases, it is preferable to use high-melting point metal such as Mo or W for the electrode. When using the electrode made of the metallic bulk material, it is possible to achieve favorable adhesion of the electrode to the aluminum nitride sintered body by use of the hot press sintering method because the hot press sintering method performs uniaxial pressing at the time of sintering.

Meanwhile, when producing a resistive heating element, the raw material mixed powder can be formed into a given shape and then heated and sintered by use of the hot press method, the pressureless sintering method or the like. Alternatively, the produced sintered body can be formed into a desired shape afterward. In the case of a complicated shape, it is also possible to use electric discharge machining.

The aluminum nitride sintered body according to this embodiment has a combination of the heat resistance, the corrosion resistance to halogen gas and the like, the high thermal conductivity, and the desired electric conductivity. Therefore, the aluminum nitride sintered body can be used as a component for a semiconductor-manufacturing apparatus which applies corrosive gas or a corrosive solution for use in the semiconductor process. Here, the semiconductor-manufacturing apparatus includes a film depositing apparatus such as a plasma CVD apparatus or a sputter, a plasma etching apparatus, a cleaning apparatus, and the like. For example, the component for the semiconductor-manufacturing apparatus includes a susceptor, a heater, an electrostatic chuck, a ring member, a dome member, and the like. Moreover, the aluminum nitride sintered body can be used as a component for a part of an electric and electronic device which requires electric field control, where given volume resistivity is required.

Particularly, when the volume resistivity of the aluminum nitride sintered body at room temperature is in a range from $10^8$ to $10^{12}$ Ωcm, the aluminum nitride sintered body can be suitably used as a base substance of an electrostatic chuck applying Johnsen-Rahbek's principle. The electrostatic chuck is a disk-shaped aluminum nitride sintered body which includes a bulk electrode or a printed electrode. Here, it is not always necessary to form the entire base substance by use of the aluminum nitride sintered body according to this embodiment. The aluminum nitride sintered body according to this embodiment which contains the carbon fibers only at a dielectric layer part between the electrode and chucking surface can be formed. This aluminum nitride sintered body has a small temperature dependency of resistivity, so the electrostatic chuck which uses the aluminum nitride ceramics as a base substance can produce a stable chucking force at a wide temperature range.

Moreover, when the volume resistivity of the aluminum nitride sintered body at room temperature is equal to or below $10^8$ Ωcm, the aluminum nitride sintered body can be suitably used as a ring-shaped member to be disposed around the electrostatic chuck in the plasma CVD or the plasma etching apparatus. When the ring-shaped member according to this embodiment is used instead of a conventional insulative ring-shaped member, it is possible to prevent a charge-up of the ring-shaped member which would occur at the time of plasma generation. Occurrence of a charge-up makes ion density nonuniform, and plasma distribution becomes uneven. However, this embodiment can prevent such a charge-up and therefore achieve uniform plasma distribution. Such an effect is significant particularly when the aluminum nitride sintered body has the volume resistivity as the same level as that of a Si wafer.

Meanwhile, when the volume resistivity of the aluminum nitride sintered body at room temperature is equal to or below $10^6$ Ωcm, the aluminum nitride sintered body can be widely used as a novel electrically conductive member having heat resistance, corrosion resistance and high thermal conductivity. For example, the aluminum nitride sintered body can be suitably used as a counter electrode for generating radio-frequency waves for a semiconductor-manufacturing apparatus, or as an electrode or a resistive heating element to be exposed to a variety of corrosive gas such as halogen gas. In addition to components for the semiconductor-manufacturing apparatuses, the aluminum nitride sintered body can be suitably used as various resistive heating elements, antistatic components or as electric-field control components particularly at a high temperature or under a corrosive gas environment where metal cannot be used.

The electric-field control component may be a spacer to be disposed between a face plate and a back plate of a flat display, for example. This spacer has a function as a supporting member to support the face plate and the back plate, and is therefore required to have sufficient strength. Moreover, it is desirable that the spacer has appropriate electric conductivity for preventing electric charge on the spacer surface so as not to be influenced by a flow of electrons which are discharged from an electron emission element toward the face plate, and for performing voltage control between the face plate and the back plate to avoid distortion of the flow of electrons. Furthermore, in terms of a range of the electric conductivity, it is desirable that the volume resistivity is selectable in a range from 10 Ωcm to $10^{12}$ Ωcm depending on conditions of the display. Therefore, the aluminum nitride sintered body containing the carbon fibers according to the above-described embodiment can be suitably used.

EXAMPLES

Now, examples and comparative examples of the present invention will be described.

Examples 1 to 18

<Conditions for Preparing Mixed Powder>

Firstly, the mixed powder was produced by mixing aluminum nitride powder, carbon fibers, and yttrium oxide powder together. As for the aluminum nitride powder, commercially available powder synthesized by the reduction nitriding method with an average grain diameter of 1.2 μm (high purity AlN powder, made by Tokuyama Corp.) was used. As for the carbon fibers, carbon fibers produced by the gas-phase method and having fiber diameters of about 150 nm, fiber lengths of 10 to 20 μm, aspect ratios of 10 to 500, and volume resistivity of $1\times10^{-4}$ Ωcm (VGCF, made by Showa Denko K.K.) was used. Moreover, as for the yttrium oxide powder, powder having purity of 99.9% or above and an average grain diameter of 0.7 μm (C grade, made by H.C. Starck) was used.

The aluminum nitride powder (100 parts by weight), 2 parts by weight of the yttrium oxide powder, and the carbon fibers in a range from 0.1 to 1 part by weight were mixed together to achieve a given proportion, and then isopropyl alcohol was added as a solvent. Then the mixture was subjected to wet-type mixing for two hours by use of a pot made of nylon and balls made of alumina. After mixing, the slurry was taken out and dried at 110° C. to obtain mixed powder. Here, the values in parts by weight of the mixed powder disregard the content of impurities. The addition amounts of the carbon fibers in the respective examples were shown in Table 1.

<Conditions for Forming and Sintering>

The mixed powder was put into a mold and subjected to uniaxial pressure forming at a pressure of 200 kgf/cm². In this way, a disk-shaped compact having a diameter of ϕ50 mm and a thickness of about 20 mm was formed.

The hot press method was used for sintering. The obtained compact was put in a graphite mold for sintering and was set to a hot press sintering furnace. The pressure was set to 200 kgf/cm² and a maximum temperature during sintering was set in a range from 1700° C. to 2000° C. After holding the temperature for four hours, the compact was cooled down. Concerning the atmosphere, a vacuum atmosphere was applied from room temperature to 1000° C., and a 0.15 MPa nitrogen atmosphere was applied from 1000° C. to the sintering temperature. The maximum temperatures (the sintering temperatures) during sintering in the respective examples are shown in Table 1.

<Evaluations of Sintered Bodies>

The density, open porosity, volume resistivity, bending strength, thermal conductivity, thermal diffusivity, oxygen content, carbon content, Y content, and $Y_2O_3$ content were evaluated for each of the sintered bodies thus obtained. Concrete measurement methods for the respective evaluations are as follows.

(1) Density,
(2) Open Porosity: Evaluated by the Archimedean method while using purified water as a medium.
(3) Volume Resistivity: Samples having electric conductivity below $1\times10^6$ Ωcm were measured by the four-pole method. On the contrary, samples having electric conductivity equal to or above $1\times10^6$ Ωcm were measured by a method according to JIS C2141 at room temperature in the atmosphere. Each sample piece was formed into a shape having dimensions of ϕ50×1 mm, and silver paste was used to form respective electrodes so as to satisfy the following dimensions, namely, a diameter of a main electrode at 20 mm, an inside diameter of a guard electrode at 30 mm, an outside diameter of the guard electrode at 40 mm, and a diameter of an application electrode at 45 mm. An applied voltage was set to 500 V/mm, and an electric current at one minute after voltage application was measured to calculate the volume resistivity.
(4) Thermal Conductivity and Thermal Diffusivity: Measured by the laser flash method.
(5) Bending Strength: Four-point bending strength was measured at room temperature according to JIS R1601.
(6) Oxygen Content: Quantitatively determined by inert gas melting infrared absorptiometry.
(7) Carbon Content: Quantitatively determined by high frequency heating infrared absorptiometry.
(8) Y Content: Quantitatively determined by inductively coupled. plasma (ICP) emission spectrum analysis.
(9) $Y_2O_3$ Content: The Y quantitative value obtained by the ICP emission spectrum analysis was converted into the $Y_2O_3$ content.

Results are shown in Table 1 and Table 3.

Comparative Examples 1 to 13

Aluminum nitride sintered bodies were produced by use of substantially similar conditions to Examples 1 to 18.

Figure 2:
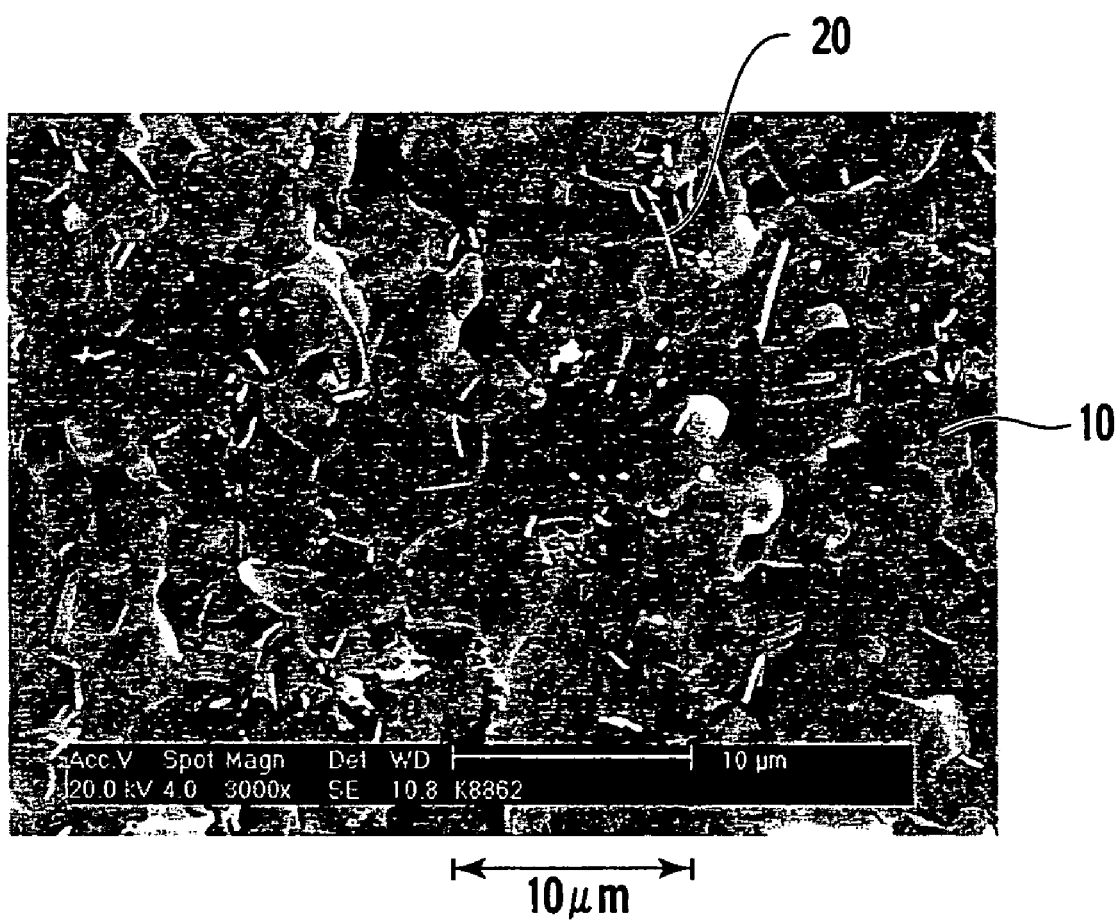
FIG. 2 is a scanning electron microscope photograph showing a microstructure of an aluminum nitride sintered body according to Example 5 of the present invention.

However, in Comparative Examples 1 to 10, spherical carbon grains having two-dimensional grain diameter in a range from 2 μm to 10 μm were added instead of the carbon fibers. In Comparative Examples 8 to 10, the atmosphere during sintering was set to vacuum (nitrogen pressure at 0 MPa). Moreover, no carbon was added to aluminum nitride in Comparative Examples 11 to 13. Conditions for production and evaluation results are shown in FIG. 2.

Results of Examples 1 to 18 and Comparative Examples 1 to 13

FIG. 1 shows relations between the addition amounts of carbon and the volume resistivity of the aluminum nitride sintered bodies at room temperature resulted from Examples 1 to 18 and Comparative Examples 1 to 13. No change was observed in terms of the volume resistivity when the spherical carbon grains were added and the addition amount was 1 part by weight. On the contrary, in the case where the carbon fibers were added, the volume resistivity was drastically reduced to an electrically conductive region from about $10^3$ to $10^{-1}$ Ωcm when the addition amount of of carbon exceeded about 0.4 to 0.5 part by weight (about 0.4% to 0.5%). Moreover, once after the electrically conductive paths were formed therein, the decrease in volume resistivity with increasing the addition amount of the carbon fibers became gradual.

As described above, the reason of the drastic reduction in volume resistivity of the aluminum nitride sintered body when the addition amount of the carbon fibers exceeds a certain amount is considered that the carbon fibers form three-dimensional electrically conductive paths inside the aluminum nitride sintered body when the addition amount of the carbon fibers exceeds the certain amount. It is also conceivable that the electrically conductive paths can be formed by use of a small addition amount of the carbon fibers as compared to the case of adding normal spherical carbon grains. From this result, it is predictable that the volume resistivity of the aluminum nitride can be reduced by a less addition amount by use of carbon fibers having higher aspect ratios and smaller diameters.

To be more precise, when the sintering temperature was 1800° C., it was possible to reduce the volume resistivity to a semiconductive region at about $10^8$ Ωcm by setting the addition amount of the carbon fibers to about 0.6 part by weight (0.58%). Moreover, it was possible to reduce the volume resistivity to an electrically conductive region equal to or below 100 Ωcm by setting the addition amount of the carbon fibers to about 1.0 part by weight (0.97%). Meanwhile, when the sintering temperature was 1900° C., it was possible to reduce the volume resistivity to about $10^3$ Ωcm by setting the addition amount of the carbon to about 0.6 part by weight. Moreover, when the sintering temperature was 2000° C., it was possible to reduce the volume resistivity to equal to or below $10^3$ Ωcm by setting the addition amount of the carbon to about 0.5 part by weight (0.49%). In this way, it was made clear that the same addition amount of the carbon fibers could reduce the volume resistivity by raising the sintering temperature.

FIG. 2 shows a scanning electron microscope (SEM) photograph of a fracture surface of the aluminum nitride sintered body of Example 12. As it is apparent from this SEM photograph, the aluminum nitride sintered body of Example 12 shows a dense polycrystalline structure and partially contains carbon fibers 20 inside grains of aluminum nitride 10 and on grain boundaries thereof. Moreover, it was confirmed that the carbon fibers existing in the aluminum nitride sintered body maintained fibrous aspects and that no destruction by sintering or distortion of the carbon fibers occurred after the manufacturing process. The structures of the aluminum nitride sintered bodies of other examples were similar to the structure in Example 12.

Table 3 shows results of composition analyses of the aluminum nitride sintered bodies of Examples 5, 11, 12, and 14. As shown in the table, the amounts of carbon (C) in the aluminum nitride sintered bodies substantially correspond to the addition amounts of the carbon fibers which were added at the mixing process. From the results of the composition analyses, it was also confirmed that the added carbon fibers remain almost completely in the aluminum nitride sintered bodies without destruction by sintering. Although the analyzed amounts of carbon are slightly greater than the addition amounts of the carbon fibers, such a phenomenon is considered attributable to influences of impurity carbon contained in the raw materials.

Meanwhile, as it was evident by comparing the properties of the aluminum nitride sintered bodies of Examples 1 to 18 in Table 1 with the properties of the aluminum nitride sintered bodies of Comparative Examples 9 to 13 in Table 2, the values of density and thermal conductivity of the aluminum nitride sintered bodies containing about 1 part by weight (about 1% as the content in the sintered bodies) of the carbon fibers at least showed the properties nearly equal to that of the aluminum nitride sintered bodies which did not contain the carbon fibers. Concerning the bending strength, certain improvement was observed.

To be more precise, as it was evident by comparing the aluminum nitride sintered body of Example 12 produced at the sintering temperature of 1900° C. with that of Comparative Example 12 not containing the carbon which was produced similarly at the sintering temperature of 1900° C., for example, the volume resistivity was extremely low at 6 Ωcm in Example 12 because of addition of the carbon fibers, but the density thereof was substantially the same as that in Comparable Example 12. Concerning the bending strength, Example 12 with addition of the carbon fibers showed 416 MPa and was strengthened more than 390 MPa in Comparative Example 12. Meanwhile, concerning the thermal conductivity, Example 12 showed the heat conductivity of 133 W/mK which was slightly inferior to 188 W/mK in Comparative Example 12. Nevertheless, Example 12 maintained a sufficiently high value. This thermal conductivity value was sufficiently high in comparison at least with a conventional low-resistance aluminum nitride sintered body obtained by adding a certain amount of a rare-earth oxide or with a low-resistance aluminum nitride sintered body obtained by adding an electrically conductive material such as TiN.

From these results, in the aluminum nitride sintered body containing the carbon fibers, which had the average fiber diameter from 100 nm to 200 nm inclusive, in the amount from 0.4% to 1.0% inclusive or more preferably from 0.6% to 1.0% inclusive, it was confirmed that the low volume resistivity in a range from $10^9$ to 1 Ωcm and the favorable bending strength could be obtained while maintaining the high thermal conductivity of the mother material.

Examples 19 to 23

In Examples 19 to 23, the addition amounts of the carbon fibers were increased as compared to Examples 1 to 18. The mixed powder was produced by adding 2 to 10 parts by weight of the carbon fibers, 2 parts by weight of the yttrium oxide powder, and isopropyl alcohol to 100 parts by weight of the aluminum nitride powder. Other conditions for producing the mixed powder were similar to the conditions in Examples 1 to 18.

Moreover, the addition amounts of the yttrium oxide powder were increased in Examples 22 and 23. Specifically, the mixed powder was produced by adding 10 parts by weight of the carbon fibers, 5 parts by weight of the yttrium oxide powder, and isopropyl alcohol to 100 parts by weight of the aluminum nitride powder. Other conditions for producing the mixed powder were similar to the conditions in Examples 1 to 18.

The maximum temperature during sintering was set to 2000° C. in Examples 19 to 22. Meanwhile, the maximum temperature during sintering was set to 1900° C. in Example 23. While applying other conditions similar to those in Examples 1 to 18, sintering was performed by the hot press method.

The density, open porosity, and volume resistivity of the obtained sintered bodies were evaluated. Note that the bending strength, thermal conductivity, and thermal diffusivity were also evaluated in Examples 21 to 23.

The conditions for production and evaluation results are shown in Table 4.

Results of Examples 19 to 23

Figure 3:
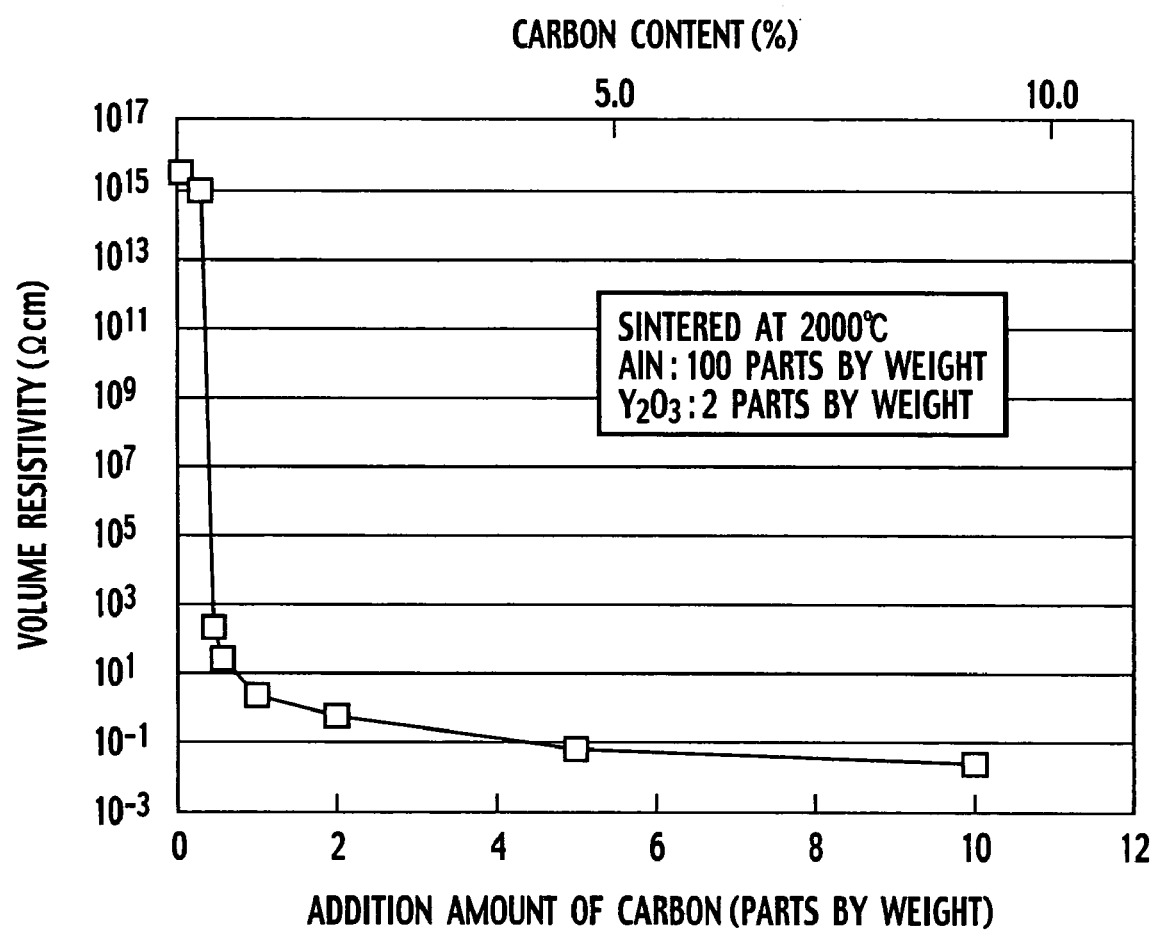
FIG. 3 is a graph showing a relation between an addition amount of carbon fibers and volume resistivity of an aluminum nitride sintered body according to an example of the present invention.

FIG. 3 shows relations between the addition amounts of the carbon fibers and the volume resistivity of the aluminum nitride sintered bodies at room temperature resulted from Examples 19 to 21 and Examples 1 to 6 for reference. In any of Examples cited herein, the addition amount of yttrium oxide was 2 parts by weight and sintering was performed at the sintering temperature of 2000° C. The volume resistivity was drastically reduced to an electrically conductive region equal to or below $10^3$ Ωcm when the addition amount of the carbon fibers exceeded about 0.4 to 0.5 part by weight. When the addition amount of the carbon fibers was further increased, although the tendency of reduction in the volume resistivity was moderated, the volume resistivity was gradually reduced along with the increase in the addition amount of the carbon fibers until the addition amount of the carbon fibers reached 10 parts by weight (8.9%). As a consequence, when the addition amount of the carbon fibers was equal to 10 parts by weight, the volume resistivity reached $3\times10^{-2}$ Ωcm. From these results, it is predictable that the effect of reduction in electric conductivity by increasing the contained carbon fibers will become extremely small when the content of the carbon fibers in the sintered body exceeds 20 parts by weight and thereby reaches about 20%.

On the contrary, as shown in Table 4, in case of Example 21 where the addition amount of the carbon fibers was equal to 10 parts by weight, the thermal conductivity falls below 100 W/mK which represented a slightly lower value as compared to Examples 1 to 10 where the addition amounts of the carbon fibers were equal to or below 1 part by weight. However, as shown in Example 22, the values of thermal conductivity and thermal diffusivity were improved when the addition amount of yttrium oxide was increased to 5 parts by weight.

Moreover, it was confirmed that the bending strength in Example 21 and 22, where the addition amounts of the carbon fibers were equal to 10 parts by weight, was considerably improved as compared to Examples 1 to 6 where the additions amounts of the carbon fibers were equal to or below 1 part by weight.

In this way, when the addition amount of the carbon fibers is increased to the range from about 10% to 20%, it is possible to increase the strength of the sintered body despite reduction in the thermal conductivity and the like. Furthermore, it is possible to obtain an electrically conductive material having extremely small resistance equal to or below $10^{\times 1}$ Ωcm. Therefore, such an electrically conductive material can be optimally applied to applications which require the strength and the electric conductivity.

As described above, the aluminum nitride sintered body of the present invention is characterized by containing the carbon fibers. According to the characteristic, it is possible to provide the aluminum nitride sintered bodies having various levels of electric conductivity depending on the contents of the carbon fibers. The carbon fibers easily form the continuous electrically conductive paths inside the sintered body due to ease of contact with adjacent carbon fibers which is attributable to the electric conductivity of carbon and to the fibrous aspect. Therefore, it is possible to reduce the volume resistivity of the aluminum nitride sintered body by adding an extremely small amount of the carbon fibers without damaging the properties possessed by the aluminum nitride sintered body. Moreover, it is possible to increase the strength of the sintered body by adding the carbon fibers.

It is preferable that the aluminum nitride sintered body of the present invention satisfies the volume resistivity at room temperature equal to or below $1\times10^{12}$ Ωcm. When this volume resistivity is satisfied, the aluminum nitride sintered body can be suitably used as a component for a semiconductor-manufacturing apparatus or as an electrically conductive member.

Moreover, in the aluminum nitride having the above-mentioned volume resistivity, it is preferable that the content of the carbon fibers is equal to or below 5%, or more preferably equal to or below 1%. Due to the small content of the carbon fibers, it is possible to maintain the properties of the aluminum nitride which is the mother material. When the content is equal to or below 5%, or more preferably equal to or below 1%, it is possible to substantially maintain the properties of the mother material of the aluminum nitride sintered body.

In the aluminum nitride sintered body of the present invention, it is preferable that the volume resistivity at room temperature is equal to or below $1\times10^4$ Ωcm. When the volume resistivity is satisfied, the aluminum nitride sintered body can be suitably used as an electrically conductive member.

Moreover, in the aluminum nitride having the above-mentioned volume resistivity, it is preferable that the content of the carbon fibers is equal to or below 20%, or more preferably equal to or below 10%. It is possible to impart the high strength, the favorable corrosion resistance and the fine heat resistance.

In the aluminum nitride sintered body, it is preferable that the carbon fibers form the continuous electrically conductive paths inside the aluminum nitride sintered body. Although the volume resistivity of aluminum nitride being an insulator has a large temperature dependency, the volume resistivity of the carbon fibers has a small temperature dependency as similar to other electrically conductive materials. Accordingly, it is possible to suppress the temperature dependency of the volume resistivity as the entire aluminum nitride sintered body by using the carbon fibers as the electrically conductive paths.

Moreover, it is preferable that an average fiber diameter of the carbon fibers is equal to or below 1 μm. By using the fiber with diameters within this range, it is possible to reduce the volume resistivity efficiently with a small addition amount.

It is preferable that an average fiber length of the carbon fibers is longer than the average grain diameter of the aluminum nitride sintered body. In this case, it is easy to acquire an aspect of the carbon fibers protruding out of the respective grains of the aluminum nitride. Accordingly, it is easy to form the continuous electrically conductive paths entirely in the aluminum nitride sintered body.

It is preferable that an average aspect ratio (fiber length/fiber diameter) of the carbon fibers is equal to or above 5. The contained carbon fibers easily contact one another when the carbon fibers have the fiber lengths equivalent to the aspect ratio equal to or above 5. Accordingly, it is easy to form the electrically conductive paths with a small content.

Moreover, it is preferable that the average fiber diameter of the carbon fibers is equal to or below ⅕ of the average grain diameter of the aluminum nitride sintered body. The carbon fibers are dispersed not only on the grain boundaries but also inside the grains, and thereby contribute to improvement in the strength of the aluminum nitride sintered body.

Meanwhile, it is preferable that the average fiber diameter of the carbon fibers is in a range from 5 nm to 200 nm. When the carbon fibers have such small diameters, it is possible to provide the aluminum nitride sintered body with the electric conductivity and to improve the strength with a less addition amount.

Carbon nanotubes may be used for the carbon fibers. Due to minute diameters and high aspect ratios possessed by the carbon nanotubes, it is possible to impart the electric properties derived from the carbon nanotubes to the aluminum nitride sintered body with an extremely small addition amount.

The aluminum nitride sintered body of the present invention may contain a rare-earth element in an amount equal to or above 0.2% when calculated as an oxide. The sintering property is improved by existence of the rare-earth element, and a dense sintered body can be obtained easily. In addition, it is possible to improve the thermal conductivity by adding the rare-earth element.

Here, in the aluminum nitride sintered body of the present invention, the carbon fibers may be designed to have the aspect ratio equal to or above 10 and the average fiber diameter in a range from 100 nm to 200 nm inclusive, and the content of the carbon fibers may be set in a range from 0.4% to 1.0% inclusive. In this case, it is possible to obtain the volume resistivity in a range from $10^9$ Ωcm to 1 Ωcm more reliably while maintaining the properties of the aluminum nitride sintered body.

An electrostatic chuck of the present invention includes a dielectric layer made of the aluminum nitride sintered body of the present invention having the above-described properties, and an electrode to be formed on the dielectric layer. The electrostatic chuck can exert stable chucking force in a wide temperature range.

An electrically conductive member of the present invention is made of the aluminum nitride sintered body of the present invention having the above-described properties. Note that the electrically conductive member herein means a member having electric conductivity equal to or below $10^{12}$ Ωcm. Such an electrically conductive member can be used for various applications as a member provided with the heat resistance, the corrosion resistance and the strength.

A component for a semiconductor-manufacturing apparatus of the present invention is made of the aluminum nitride sintered body of the present invention having the above-described properties. Such a component can be used for various applications as a component which is provided with electric properties similar to a semiconductor, the heat resistance, the corrosion resistance and the strength.

Note that the above-described electrically conductive member is not only applicable to the above-mentioned electrostatic chuck, but is also applicable to various components including an antistatic component, an electric-field control component, a resistive heating element, and the like.

A method of manufacturing an aluminum nitride sintered body of the present invention includes the steps of mixing aluminum nitride raw material powder and carbon fibers and thereby producing mixed raw material powder, molding the mixed raw material powder and forming a compact, and heating and sintering the compact in any of a vacuum atmosphere, an inert atmosphere and a reductive atmosphere and thereby forming a sintered body.

According to this manufacturing method, the heating process is performed in any of the vacuum atmosphere, the inert atmosphere and the reductive atmosphere. Therefore, it is possible to substantially maintain the original aspect of the carbon fibers which are mixed in the preparation process and to incorporate the carbon fibers into the aluminum nitride sintered body. As a result, it is possible to impart the electric conductivity to the aluminum nitride sintered body by adding an extremely small amount of the carbon fibers without damaging the properties possessed by the aluminum nitride sintered body.

Moreover, in this manufacturing method, it is preferable that rare-earth oxide raw material powder is further added to the mixed raw material powder. Furthermore, it is preferable that the hot press sintering method is used in the step of forming the sintered body.

In addition, in this manufacturing method, it is preferable that the mixed raw material powder is formed by mixing equal to or below 5 parts by weight of the carbon fibers, or alternatively, equal to or below 20 parts by weight thereof to 100 parts by weight of the aluminum nitride raw material powder. Moreover, it is preferable that the carbon fibers have the average fiber diameter equal to or below 1 μm and the aspect ratio equal to or above 5.

Although the inventions have been described above by reference to certain embodiments and examples of the inventions, the inventions are not limited to the embodiments described above. Modifications and variations of the embodiments described above will occur to those skilled in the art, in light of the above teachings.

TABLE 1

| EXAMPLES | CONDITIONS FOR PRODUCTION*[1] ADDITION AMOUNT OF CARBON GRAINS PARTS BY WEIGHT | SINTERING TEMPERATURE ° C. | PROPERTIES OF ALUMINUM NITRIDE SINTERED BODIES OPEN POROSITY Vol % | APPARENT DENSITY g/cm$^3$ | BULK DENSITY g/cm$^3$ | VOLUME RESISTIVITY Ω · cm | BENDING STRENGTH MPa | THERMAL CONDUCTIVITY W/mK | THERMAL DIFFUSIVITY 1E−5 m$^2$/s |
|---|---|---|---|---|---|---|---|---|---|
| 1 | 0.1 | 2000 | 0.02 | 3.255 | 3.254 | 3E+15 | 346 | 130 | 5.3 |
| 2 | 0.2 | 2000 | 0.01 | 3.256 | 3.256 | 3E+15 | 364 | 126 | 5.1 |
| 3 | 0.4 | 2000 | 0.01 | 3.254 | 3.253 | 1E+15 | 395 | 120 | 4.9 |
| 4 | 0.5 | 2000 | 0.00 | 3.258 | 3.258 | 3E+02 | 357 | 143 | 5.8 |
| 5 | 0.6 | 2000 | 0.02 | 3.260 | 3.260 | 3E+01 | 361 | 139 | 5.6 |
| 6 | 1 | 2000 | 0.02 | 3.257 | 3.256 | 2E+00 | 369 | 133 | 5.4 |
| 7 | 0.1 | 1900 | 0.00 | 3.287 | 3.287 | 1E+15 | 429 | 115 | 4.7 |
| 8 | 0.2 | 1900 | 0.00 | 3.285 | 3.285 | 7E+14 | 427 | 109 | 4.4 |
| 9 | 0.4 | 1900 | 0.01 | 3.280 | 3.280 | 6E+14 | 377 | 103 | 4.2 |

TABLE 1-continued

| | CONDITIONS FOR PRODUCTION[1)] | | PROPERTIES OF ALUMINUM NITRIDE SINTERED BODIES | | | | | | |
|---|---|---|---|---|---|---|---|---|---|
| EXAMPLES | ADDITION AMOUNT OF CARBON GRAINS PARTS BY WEIGHT | SINTERING TEMPERATURE ° C. | OPEN POROSITY Vol % | APPARENT DENSITY g/cm$^3$ | BULK DENSITY g/cm$^3$ | VOLUME RESISTIVITY Ω · cm | BENDING STRENGTH MPa | THERMAL CONDUCTIVITY W/mK | THERMAL DIFFUSIVITY 1E−5 m$^2$/s |
| 10 | 0.5 | 1900 | 0.03 | 3.278 | 3.277 | 1E+14 | 441 | 147 | 5.9 |
| 11 | 0.6 | 1900 | 0.01 | 3.274 | 3.274 | 2E+03 | 397 | 139 | 5.7 |
| 12 | 1 | 1900 | 0.00 | 3.266 | 3.266 | 6E+00 | 416 | 133 | 5.4 |
| 13 | 0.5 | 1800 | 0.00 | 3.275 | 3.275 | 1E+16 | 448 | 143 | 5.8 |
| 14 | 0.6 | 1800 | 0.00 | 3.274 | 3.274 | 3E+08 | 407 | 142 | 5.8 |
| 15 | 1 | 1800 | 0.01 | 3.266 | 3.266 | 2E+01 | 322 | 136 | 5.6 |
| 16 | 0.5 | 1700 | 0.01 | 3.112 | 3.112 | 3E+15 | 371 | 108 | 4.6 |
| 17 | 0.6 | 1700 | 0.04 | 3.104 | 3.103 | 7E+14 | 372 | 110 | 4.7 |
| 18 | 1 | 1700 | 0.00 | 3.116 | 3.116 | 5E+01 | 400 | 108 | 4.6 |

[1)]COMMON CONDITIONS FOR PRODUCTION
HIGH-PURITY ALUMINUM NITRIDE POWDER: 100 PARTS BY WEIGHT USED
$Y_2O_3$ POWDER: 2 PARTS BY WEIGHT ADDED
TIME FOR MAINTAINING THE MAXIMUM TEMPERATURE DURING SINTERING: 4 HOURS
$N_2$ PRESSURE DURING SINTERING: 0.15 MPa
CARBON GRAINS (DIAMETER AT 150 NM, ASPECT RATIO IN A RANGE FROM 10 TO 500)

TABLE 2

| | CONDITIONS FOR PRODUCTION[1)] | | PROPERTIES OF ALUMINUM NITRIDE SINTERED BODIES | | | | | | |
|---|---|---|---|---|---|---|---|---|---|
| COMPARATIVE EXAMPLES | ADDITION AMOUNT OF CARBON GRAINS PARTS BY WEIGHT | SINTERING TEMPERATURE ° C. | OPEN POROSITY Vol % | APPARENT DENSITY g/cm$^3$ | BULK DENSITY g/cm$^3$ | VOLUME RESISTIVITY Ω · cm | BENDING STRENGTH MPa | THERMAL CONDUCTIVITY W/mK | THERMAL DIFFUSIVITY 1E−5 m$^2$/s |
| 1 | 1 | 2000 | 0.02 | 3.256 | 3.255 | 3E+14 | 320 | 158 | 6.5 |
| 2 | 0.6 | 2000 | 0.02 | 3.256 | 3.255 | 4E+14 | 361 | 163 | 6.7 |
| 3 | 0.4 | 2000 | 0.01 | 3.255 | 3.254 | 4E+14 | 368 | 155 | 6.3 |
| 4 | 0.2 | 2000 | 0.00 | 3.258 | 3.258 | 4E+14 | 317 | 152 | 6.2 |
| 5 | 0.6 | 1800 | 0.02 | 3.265 | 3.264 | 4E+15 | 445 | 123 | 5.0 |
| 6 | 0.4 | 1800 | 0.02 | 3.272 | 3.271 | 8E+15 | 507 | 127 | 5.2 |
| 7 | 0.2 | 1800 | 0.03 | 3.282 | 3.281 | 1E+16 | 523 | 140 | 5.7 |
| 8[*2)] | 1 | 1900 | 0.05 | 3.267 | 3.265 | 3E+14 | 416 | 147 | 6.0 |
| 9[*2)] | 0.6 | 1900 | 0.03 | 3.267 | 3.266 | 2E+14 | 441 | 148 | 6.0 |
| 10[*2)] | 0.4 | 1900 | 0.06 | 3.267 | 3.265 | 2E+14 | 384 | 147 | 6.0 |
| 11 | 0 | 1800 | 0.08 | 3.302 | 3.299 | 6E+15 | 367 | 171 | 6.9 |
| 12 | 0 | 1900 | 0.02 | 3.280 | 3.280 | 8E+14 | 390 | 188 | 7.6 |
| 13 | 0 | 2000 | 0.02 | 3.269 | 3.269 | 6E+13 | 355 | 194 | 7.9 |

[1)]COMMON CONDITIONS FOR PRODUCTION
HIGH-PURITY ALUMINUM NITRIDE POWDER: 100 PARTS BY WEIGHT USED
$Y_2O_3$ POWDER: 2 PARTS BY WEIGHT ADDED
TIME FOR MAINTAINING THE MAXIMUM TEMPERATURE DURING SINTERING: 4 HOURS
$N_2$ PRESSURE DURING SINTERING: 0.15 MPa
[*2)]$N_2$ PRESSURE DURING SINTERING: 0 MPa

TABLE 3

| | COMPOSITION OF RAW MATERIALS (AlN: 100 PARTS BY WEIGHT) | | SINTERING CONDITION SINTERING TEMPERATURE ° C. | COMPOSITION OF ALUMINUM NITRIDE SINTERED BODIES | | | |
|---|---|---|---|---|---|---|---|
| | ADDITION AMOUNT OF C FIBERS PARTS BY WEIGHT | ADDITION AMOUNT OF $Y_2O_3$ PARTS BY WEIGHT | | O % | C % | Y % | $Y_2O_3$ CONVERTED VALUE wt % |
| EXAMPLE 5 | 0.6 | 2 | 2000 | 0.49 | 0.64 | 0.49 | 0.62 |
| EXAMPLE 11 | 0.6 | 2 | 1900 | 1.01 | 0.63 | 1.19 | 1.51 |
| EXAMPLE 12 | 1.0 | 2 | 1900 | 1.05 | 1.01 | 1.34 | 1.70 |
| EXAMPLE 14 | 0.6 | 2 | 1800 | 1.18 | 0.64 | 1.46 | 1.85 |

TABLE 4

| | CONDITIONS FOR PRODUCTION | | PROPERTIES OF ALUMINUM NITRIDE SINTERED BODIES | | | | | | |
|---|---|---|---|---|---|---|---|---|---|
| EXAMPLES | ADDITION AMOUNT OF CARBON GRAINS PARTS BY WEIGHT | SINTERING TEMPERATURE °C. | OPEN POROSITY Vol % | APPARENT DENSITY g/cm³ | BULK DENSITY g/cm³ | VOLUME RESISTIVITY Ω·cm | BENDING STRENGTH MPa | THERMAL CONDUCTIVITY W/mK | THERMAL DIFFUSIVITY 1E−5 m²/s |
| 19 | 2.0 | 2000 | 0.10 | 3.23 | 3.23 | 6E−01 | — | — | — |
| 20 | 5.0 | 2000 | 0.05 | 3.20 | 3.20 | 8E−02 | — | — | — |
| 21 | 10.0 | 2000 | 0.03 | 3.10 | 3.10 | 3E−02 | 430 | 76 | 3.2 |
| 22 | 10.0 | 2000 | 0.07 | 3.23 | 3.15 | 3E−02 | 463 | 99 | 4.2 |
| 23 | 10.0 | 1900 | 0.07 | 3.20 | 3.14 | 3E−02 | 419 | — | — |

ADDITION AMOUNTS OF $Y_2O_3$
EXAMPLES 19 TO 21: 2 PARTS BY WEIGHT
EXAMPLES 22 AND 23: 5 PARTS BY WEIGHT

What is claimed is:

1. An aluminum nitride sintered body comprising:
   carbon fibers configured to control volume resistivity of the aluminum nitride sintered body;
   wherein a content of the carbon fibers is less than or equal to 10%; and
   wherein the carbon fibers form a continuous electrically conductive path in the aluminum nitride sintered body.

2. The aluminum nitride sintered body according to claim 1, wherein the volume resistivity at room temperature is less than or equal to $1 \times 10^{12}$ Ωcm.

3. The aluminum nitride sintered body according to claim 2, wherein a content of the carbon fibers is less than or equal to 5%.

4. The aluminum nitride sintered body according to claim 3, wherein the content of the carbon fibers is less than or equal to 1%.

5. The aluminum nitride sintered body according to claim 1, wherein the volume resistivity at room temperature is less than or equal to $1 \times 10^4$ Ωcm.

6. The aluminum nitride sintered body according to claim 1, wherein an average aspect ratio calculated as a fiber length divided by a fiber diameter of the carbon fibers is at least 5.

7. The aluminum nitride sintered body according to claim 1, wherein an average fiber diameter of the carbon fibers is less than or equal to 1 μm.

8. The aluminum nitride sintered body according to claim 1, wherein an average fiber length of the carbon fibers is longer than an average grain size of the aluminum nitride sintered body.

9. The aluminum nitride sintered body according to claim 1, wherein an average fiber diameter of the carbon fibers is less than or equal to one-fifth of an average grain size of the aluminum nitride sintered body.

10. The aluminum nitride sintered body according to claim 1, wherein an average fiber diameter of the carbon fibers is in a range of 5 nm to 200 nm inclusive.

11. The aluminum nitride sintered body according to claim 1, wherein the carbon fibers are carbon nanotubes.

12. The aluminum nitride sintered body according to claim 1, wherein the carbon fibers have aspect ratios of at least 10 and an average fiber diameter in a range of 100 nm to 200 nm inclusive; and
   wherein a content of the carbon fibers is in a range of 0.4% to 1% inclusive.

13. The aluminum nitride sintered body according to claim 1, wherein the carbon fibers have aspect ratios of at least 10 and an average fiber diameter in a range of 100 nm to 200 nm inclusive; and
   wherein a content of the carbon fibers is in a range of 1% to 10% inclusive.

14. The aluminum nitride sintered body according to claim 1, wherein the aluminum nitride sintered body has a thermal conductivity that is at least 100 W/mK.

15. The aluminum nitride sintered body according to claim 1, wherein the aluminum nitride sintered body has bending strength of at least 300 MPa.

16. The aluminum nitride sintered body according to claim 1, further comprising at least 0.2% of a rare-earth element calculated as an oxide.

17. An electrically conductive member, comprising:
   the aluminum nitride sintered body set forth in claim 1, wherein the aluminum nitride sintered body is configured to form the electrically conductive member.

18. A component for a semiconductor manufacturing apparatus, comprising:
   the electrically conductive member set forth in claim 17, wherein the aluminum nitride sintered body is configured to form the component for a semiconductor manufacturing apparatus.

19. An antistatic component, comprising:
   the electrically conductive member set forth in claim 17, wherein the aluminum nitride sintered body is configured to form the antistatic component.

20. An electric-field control component, comprising:
   the electrically conductive member set forth in claim 17, wherein the aluminum nitride sintered body is configured to form the electric-field component.

21. A resistive heating element, comprising:
   the electrically conductive member set forth in claim 17, wherein the aluminum nitride sintered body is configured to form the resistive heating element.

22. An electrostatic chuck, comprising:
   a dielectric layer made of an aluminum nitride sintered body comprising carbon fibers configured to control volume resistivity of the aluminum nitride sintered body; and
   an electrode embedded in the aluminum nitride sintered body.

* * * * *

UNITED STATES PATENT AND TRADEMARK OFFICE
CERTIFICATE OF CORRECTION

| | | |
|---|---|---|
| PATENT NO. | : 7,250,215 B2 | Page 1 of 1 |
| APPLICATION NO. | : 10/876260 | |
| DATED | : July 31, 2007 | |
| INVENTOR(S) | : Jun Yoshikawa, Naohito Yamada and Hiroya Sugimoto | |

It is certified that error appears in the above-identified patent and that said Letters Patent is hereby corrected as shown below:

Title Page

References Cited- Other Documents

*Please add:*   E. Flahaut, et al., "Carbon Nanotube-Metal-Oxide Nanocomposites: Microstructure, Electrical Conductivity and Mechanical Properties," Acta Materialia, April 28, 2000, Acta Metallurgica Inc., Elsevier Science Ltd., Acta mater, 48 (2000), pp 3803-3812.

Signed and Sealed this

Twenty-seventh Day of November, 2007

JON W. DUDAS
*Director of the United States Patent and Trademark Office*